US011912559B2

(12) United States Patent
Mycroft et al.

(10) Patent No.: US 11,912,559 B2
(45) Date of Patent: Feb. 27, 2024

(54) CLEANING DEVICE FOR NOZZLE ASSEMBLIES OF BEVERAGE DISPENSERS

(71) Applicant: THE COCA-COLA COMPANY, Atlanta, GA (US)

(72) Inventors: Damian James Reec Mycroft, Decatur, GA (US); Christopher Dennis, Milton, GA (US); Kok Seng Lee, Marietta, GA (US); Brian Barrett, Atlanta, GA (US)

(73) Assignee: The Coca-Cola Company, Atlanta, GA (US)

( * ) Notice: Subject to any disclaimer, the term of this patent is extended or adjusted under 35 U.S.C. 154(b) by 666 days.

(21) Appl. No.: 15/734,310

(22) PCT Filed: Jun. 12, 2019

(86) PCT No.: PCT/US2019/036750

§ 371 (c)(1),
(2) Date: Dec. 2, 2020

(87) PCT Pub. No.: WO2019/241373

PCT Pub. Date: Dec. 19, 2019

(65) Prior Publication Data

US 2021/0221668 A1 Jul. 22, 2021

Related U.S. Application Data

(60) Provisional application No. 62/684,484, filed on Jun. 13, 2018.

(51) Int. Cl.
*B67D 1/07* (2006.01)
*A46B 9/06* (2006.01)
(Continued)

(52) U.S. Cl.
CPC .............. *B67D 1/07* (2013.01); *A46B 5/0091* (2013.01); *A46B 9/028* (2013.01); *A46B 9/06* (2013.01);
(Continued)

(58) Field of Classification Search
CPC ........... B67D 1/07; A46B 5/0091; A46B 9/06; A46B 9/028; A46B 2200/3013; B08B 1/00; B08B 1/002
(Continued)

(56) References Cited

U.S. PATENT DOCUMENTS 4,911,187 A * 3/1990 Castillo .................... A46B 7/04 132/321
5,584,690 A * 12/1996 Maassarani .......... A61C 17/005 433/116
(Continued)

FOREIGN PATENT DOCUMENTS

JP 2000107704 A 4/2000
JP 2003000481 A 1/2003
JP 2007520268 A 7/2007

OTHER PUBLICATIONS

International Search Report and Written Opinion, PCT/US2019/036750, dated Sep. 25, 2019 (13 pp.).

*Primary Examiner* — Randall E Chin
(74) *Attorney, Agent, or Firm* — Eversheds Sutherland (US) LLP

(57) ABSTRACT

A cleaning device for cleaning a dispensing nozzle assembly of a beverage dispenser is disclosed. The dispensing nozzle assembly may include a macro-ingredient/diluent outlet and a number of micro-ingredient outlets surrounding the macro-ingredient/diluent outlet. The cleaning device may include a handle, a head end rotatably attached to the handle, a guidance protrusion extending from the head end, a first set of bristles extending from the head end and surrounding the guidance protrusion, and a second set of bristles extending from the head end adjacent to the first set of bristles.

13 Claims, 10 Drawing Sheets

(51) Int. Cl.
*A46B 9/02* (2006.01)
*B08B 1/00* (2006.01)
*A46B 5/00* (2006.01)
*B67D 1/00* (2006.01)

(52) U.S. Cl.
CPC .................. *B08B 1/00* (2013.01); *B08B 1/12* (2024.01); *B67D 1/0051* (2013.01); *A46B 2200/3013* (2013.01)

(58) Field of Classification Search
USPC ............. 15/DIG. 5, 22.1, 28, 97.1, 110, 114, 15/159.1, 160, 186, 187, 188; 601/136, 601/137, 138, 142
See application file for complete search history.

(56) References Cited

U.S. PATENT DOCUMENTS

| | | | | |
|---|---|---|---|---|
| 5,891,063 | A * | 4/1999 | Vigil ...................... | A46B 13/02<br>D4/109 |
| 2005/0060822 | A1 * | 3/2005 | Chenvainu ........... | A61C 17/222<br>15/28 |
| 2006/0228161 | A1 | 10/2006 | Hoadley et al. | |
| 2006/0248667 | A1 * | 11/2006 | Kraemer .............. | A61C 17/222<br>15/28 |
| 2015/0315006 | A1 | 11/2015 | Ziesel | |

* cited by examiner

CLEANING DEVICE FOR NOZZLE ASSEMBLIES OF BEVERAGE DISPENSERS

CROSS-REFERENCE TO RELATED APPLICATIONS

The disclosure claims priority to and the benefit of U.S. provisional patent application No. 62/684,484, filed Jun. 13, 2018, which is hereby incorporated by reference herein in its entirety.

FIELD OF THE DISCLOSURE

The disclosure generally relates to cleaning devices and more particularly relates to systems and methods for cleaning dispensing nozzle assembles of beverage dispensers.

BACKGROUND

Beverage dispensers may include one or more nozzles configured to dispense one or more beverages. In certain embodiments, the nozzles may be configured to dispense multiple beverages. For example, recent improvements in beverage dispensing technology have focused on nozzle assemblies for dispensing many different types of beverages or other types of fluids. Specifically, the dispensing nozzle assemblies may be used with diluents, macro-ingredients, micro-ingredients, and other types of fluids. In this manner, the beverage dispenser preferably may provide the consumer with multiple beverage options as well as the ability to customize his or her beverage as desired.

The dispensing nozzle assemblies may be periodically cleaned in order to ensure optimal functioning thereof. For example, build up or other debris may wholly or partially block, clog, or inhibit fluid flow through the dispensing nozzle assemblies. Thus, there is a desire to clean the dispensing nozzle assemblies as quickly and as thoroughly as possible in order to ensure the optimal functioning of the dispensing nozzle assemblies.

SUMMARY

Some or all of the above needs and/or problems may be addressed by certain embodiments of the disclosure. According to an embodiment, a cleaning device for cleaning a dispensing nozzle assembly of a beverage dispenser is disclosed. The dispensing nozzle assembly may include a macro-ingredient/diluent outlet and a number of micro-ingredient outlets surrounding the macro-ingredient/diluent outlet. The cleaning device may include a handle, a head end rotatably attached to the handle, a guidance protrusion extending from the head end, a first set of bristles extending from the head end and surrounding the guidance protrusion, and a second set of bristles extending from the head end adjacent to the first set of bristles.

According to another embodiment, a method for cleaning a dispensing nozzle assembly of a beverage dispenser is disclosed. The dispensing nozzle assembly may include a macro-ingredient/diluent outlet and a number of micro-ingredient outlets surrounding the macro-ingredient/diluent outlet. The method may include positioning a guidance protrusion attached to a head end within the a macro-ingredient/diluent outlet, positioning a first set of bristles attached to the head end and surrounding the guidance protrusion in and around the macro-ingredient/diluent outlet, positioning a second set of bristles attached to the head end and adjacent to the first set of bristles in and around the micro-ingredient outlets, and rotating the head end via a handle rotatably coupled to the head end.

Accordingly to another embodiment, a cleaning device for cleaning a dispensing nozzle assembly of a beverage dispenser is disclosed. The dispensing nozzle assembly may include a macro-ingredient/diluent outlet and a number of micro-ingredient outlets surrounding the macro-ingredient/diluent outlet. The cleaning device may include a handle, a head end rotatably attached to the handle, and a guidance protrusion extending from the head end. The guidance protrusion may be configured to be inserted into the macro-ingredient/diluent outlet. The cleaning device also may include bristles extending from the head end.

Other features and aspects of the cleaning device will be apparent or will become apparent to one with skill in the art upon examination of the following figures and the detailed description. All other features and aspects, as well as other system, method, and assembly embodiments, are intended to be included within the description and are intended to be within the scope of the accompanying claims.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Figure 1:
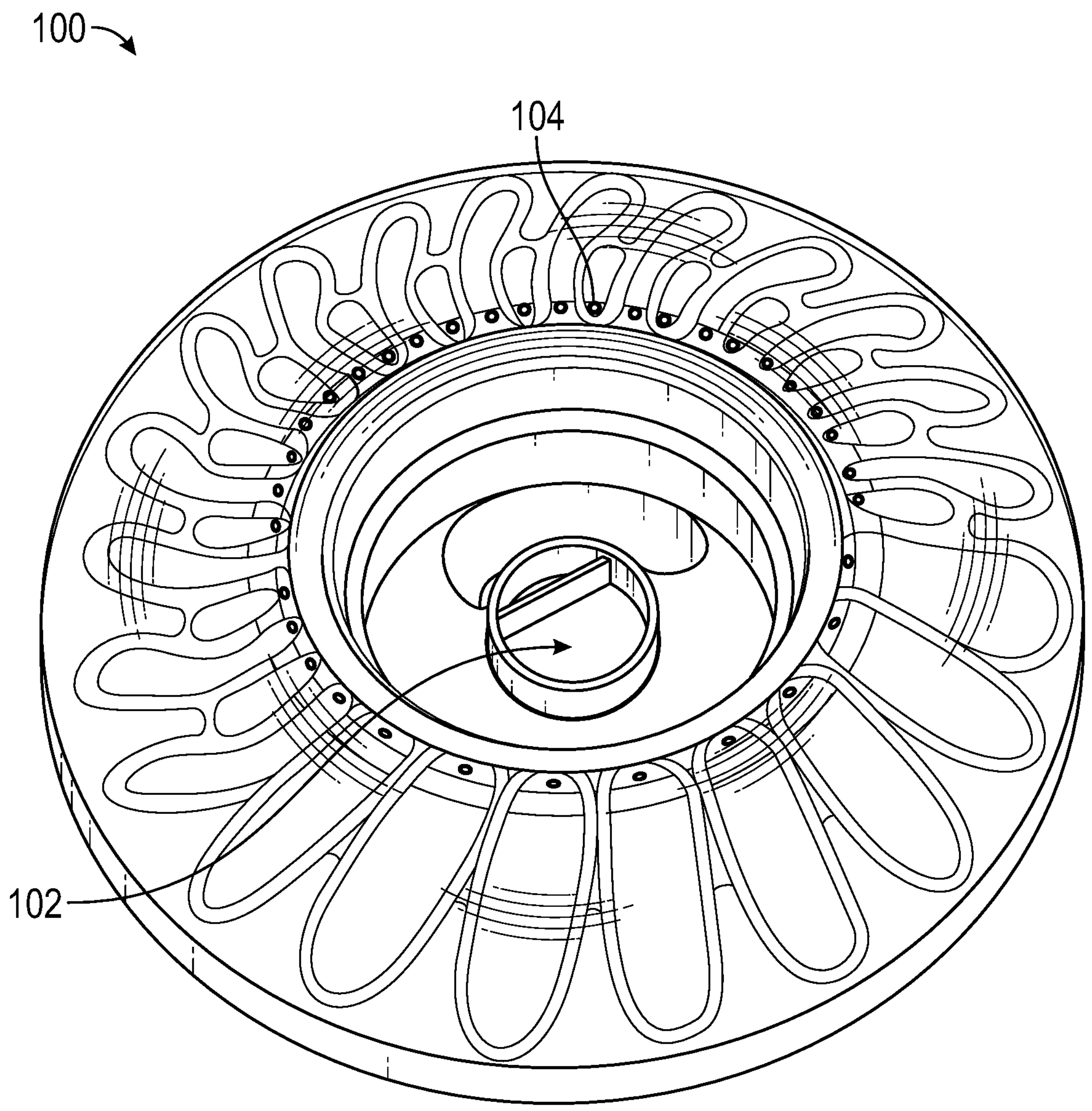
FIG. 1 depicts a dispensing nozzle assembly in accordance with one or more embodiments of the disclosure.
Figure 2A:
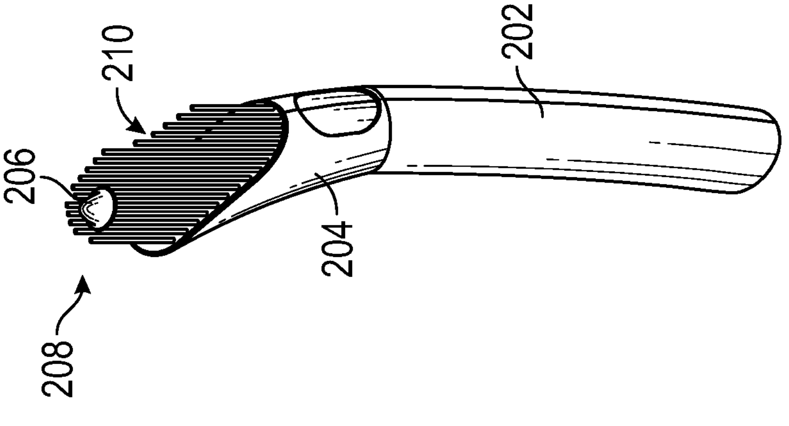
FIGS. 2A to 2I depicts a cleaning device in accordance with one or more embodiments of the disclosure.
Figure 2B:
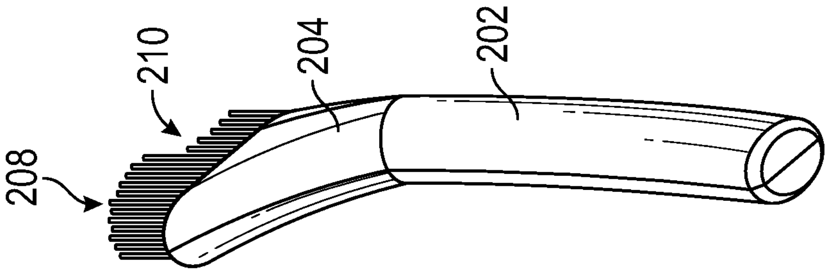
Figure 2C:
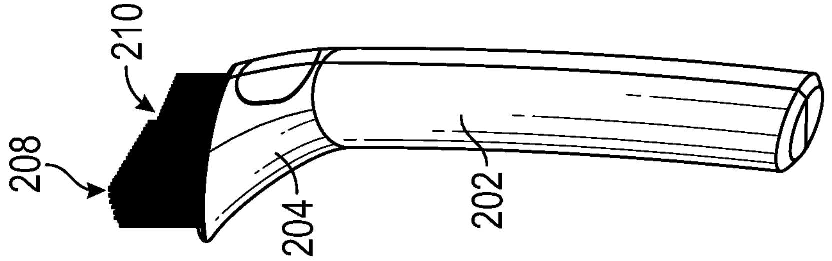
Figure 2D:
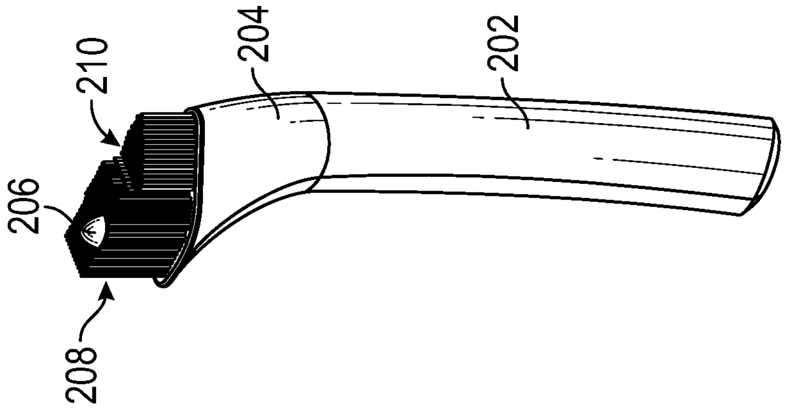
Figure 2H:
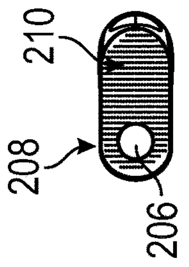
Figure 2I:
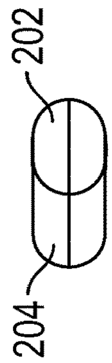
Figure 2G:
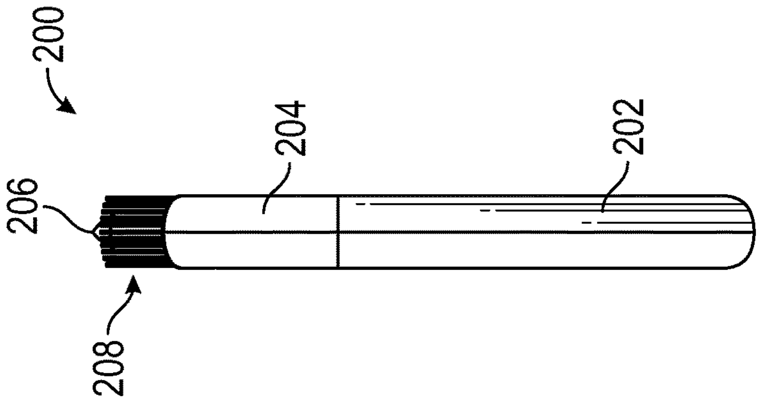
Figure 2F:
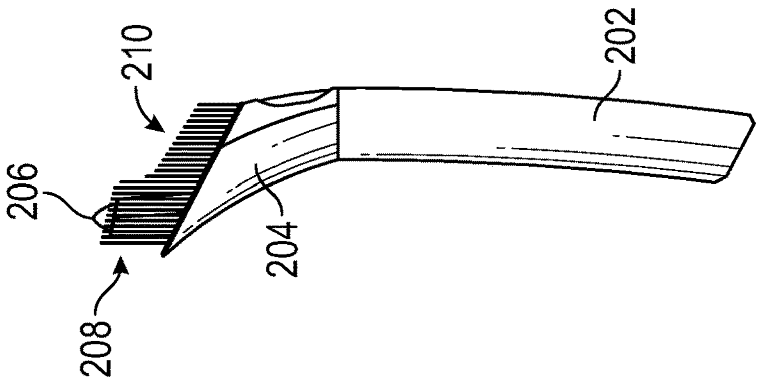
Figure 2E:
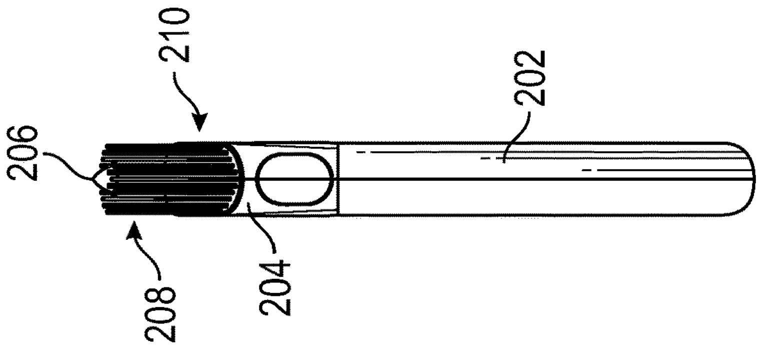

Referring now to the drawings, in which like numerals refer to like elements throughout the several views, FIG. 1 shows an example of part of a dispensing nozzle assembly 100 as is described herein. Example dispensing nozzle assemblies are depicted in U.S. Publication Nos. 2015/

0315006 and 2014/0361042, which are incorporated by reference herein in their entirety. The dispensing nozzle assembly 100 may be used as part of a beverage dispenser for dispensing many different types of beverages or other types of fluids. Specifically, the dispensing nozzle assembly 100 may be used with diluents, macro-ingredients, micro-ingredients, and other types of fluids. The diluents generally include plain water (still water or non-carbonated water), carbonated water, and other fluids. The dispensing nozzle assembly 100 may be a common dispensing nozzle assembly. The term "common" is used herein to signify that the common dispensing nozzle assembly may be commonly used with many different types of beverages and beverage dispensers.

Generally described, the macro-ingredients may have reconstitution ratios in the range from full strength (no dilution) to about six (6) to one (1) (but generally less than about ten (10) to one (1)). The macro-ingredients may include sugar syrup, HFCS ("High Fructose Corn Syrup"), concentrated extracts, purees, and similar types of ingredients. Other ingredients may include dairy products, soy, and rice concentrates. Similarly, a macro-ingredient base product may include the sweetener as well as flavorings, acids, and other common components as a beverage syrup. The beverage syrup with sugar, HFCS, or other macro-ingredient base products generally may be stored in a conventional bag-in-box container remote from the dispenser. The viscosity of the macro-ingredients may range from about 1 to about 10,000 centipoise and generally over 100 centipoises when chilled. Other types of macro-ingredients may be used herein.

The micro-ingredients may have reconstitution ratios ranging from about ten (10) to one (1) and higher. Specifically, many micro-ingredients may have reconstitution ratios in the range of about 20:1, to 50:1, to 100:1, to 300:1, or higher. The viscosities of the micro-ingredients typically range from about one (1) to about six (6) centipoise or so, but may vary from this range. Examples of micro-ingredients include natural or artificial flavors; flavor additives; natural or artificial colors; artificial sweeteners (high potency, nonnutritive, or otherwise); antifoam agents, non-nutritive ingredients, additives for controlling tartness, e.g., citric acid or potassium citrate; functional additives such as vitamins, minerals, herbal extracts, nutricuticals; and over the counter (or otherwise) medicines such as pseudoephedrine, acetaminophen; and similar types of ingredients. Various types of alcohols may be used as either macro- or micro-ingredients. The micro-ingredients may be in liquid, gaseous, or powder form (and/or combinations thereof including soluble and suspended ingredients in a variety of media, including water, organic solvents, and oils). Other types of micro-ingredients may be used herein.

As depicted in FIG. 1, the dispensing nozzle assembly 100 may include a macro-ingredient/diluent outlet 102 and a number of micro-ingredient outlets 104 surrounding the macro-ingredient/diluent outlet 102. The macro-ingredient/diluent outlet 102 and/or the micro-ingredient outlets 104 may be periodically cleaned in order to ensure optimal functioning of the dispensing nozzle assembly 100. For example, build up or other debris may wholly or partially block, clog, or inhibit fluid flow about the macro-ingredient/diluent outlet 102 and/or the micro-ingredient outlets 104. In some instances, in order to clean the dispensing nozzle assembly 100, the dispensing nozzle assembly 100 may be partially disassembled to provide access to the macro-ingredient/diluent outlet 102 and/or the micro-ingredient outlets 104, which may result in the beverage dispenser being offline. Thus, there is a desire to clean the macro-ingredient/diluent outlet 102 and/or the micro-ingredient outlets 104 as quickly and as thoroughly as possible in order to place the beverage dispenser back in operation.

FIGS. 2A to 2I depict an exemplary embodiment of a cleaning device 200 for cleaning the macro-ingredient/diluent outlet 102 and/or the micro-ingredient outlets 104 of the dispensing nozzle assembly 100. The cleaning device 200 may include a handle 202, a head end 204 rotatably attached to the handle 202, a guidance protrusion 206 extending from the head end 204, a first set of bristles 208 extending from the head end 204, and a second set of bristles 210 extending from the head end 204. The handle 202 may be configured to be grasped by a user.

The first set of bristles 208 may surround the guidance protrusion 206, and the second set of bristles 210 may be disposed adjacent to the first set of bristles 208. In some instances, the first set of bristles 208 may be longer than the second set of bristles 210. The first set of bristles 208 and the second set of bristles 210 may be any suitable size, shape, or configuration.

Figure 3:
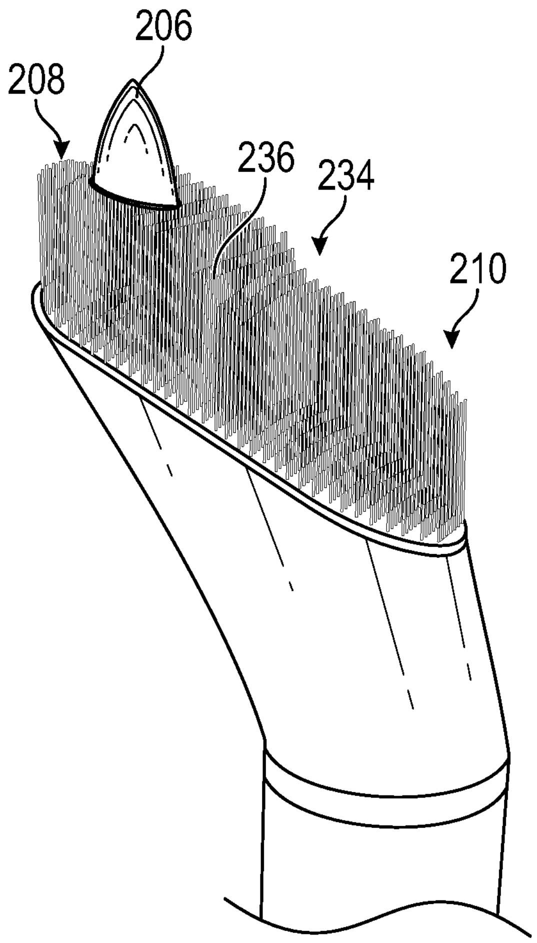
FIG. 3 depicts a cleaning device in accordance with one or more embodiments of the disclosure.

As depicted in FIG. 3, in certain embodiments, a transition region 234 may be disposed between the first set of bristles 208 and the second set of bristles 210. In some instances, the transition region 234 may include a number of stepped bristles 236 or a gradual transition from the first set of bristles 208 and/or the second set of bristles 210. The first set of bristles 208 and/or the second set of bristles 210 may be uniform or vary in size, length, and configuration. For example, some or all of the first set of bristles 208 may be the same or different thickness and length. Similarly, some or all of the second set of bristles 210 may be the same or different thickness and length. The first set of bristles 208 and the second set of bristles 210 may be customized to the size, shape, and configuration of a particular nozzle or group of nozzles.

Figure 4:
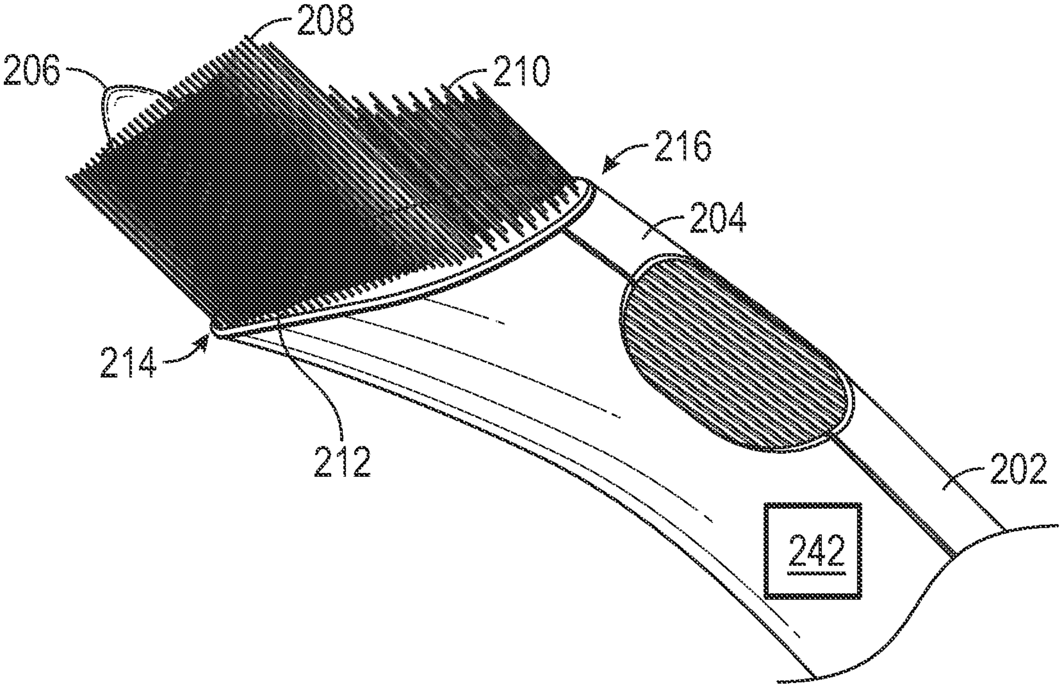
FIG. 4 depicts a cleaning device in accordance with one or more embodiments of the disclosure.

In certain embodiments, as depicted in FIG. 4, the head end 204 may include a planar surface 212. In some instances, the planar surface 212 may be angled relative to the longitudinal axis of the handle 202. The planar surface 212 may be any suitable size, shape, or configuration. The guidance protrusion 206, the first set of bristles 208, and the second set of bristles 210 may extend from the planar surface 212. In some instances, the guidance protrusion 206, the first set of bristles 208, and the second set of bristles 210 may extend from the planar surface 212 at an angle between 0 to 180 degrees. In other instances, the guidance protrusion 206, the first set of bristles 208, and the second set of bristles 210 may extend from the planar surface 212 at an angle other than 90 degrees.

In some instances, the head end 204 may be offset from the handle 202. For example, the head end 204 may extend away from the handle 202 at an angle. In certain embodiments, the guidance protrusion 206 may be located near a distal end 214 of the head end 204. Similarly, the first set of bristles 208 may be located about the distal end 214 of the head end 204, while the second set of bristles 210 may be located about a proximal end 216 of the head end 204.

The guidance protrusion 206 may be offset from the longitudinal axis of the handle 202. In some instances, the longitudinal axis of the guidance protrusion 206 may be offset from but parallel with the longitudinal axis of the handle 202. In certain embodiments, the guidance protrusion 206 may be include a pointed tip. For example, the guidance protrusion 206 may resemble a bullet or the like. The guidance protrusion 206 may be any suitable size, shape, or configuration.

Figure 5:
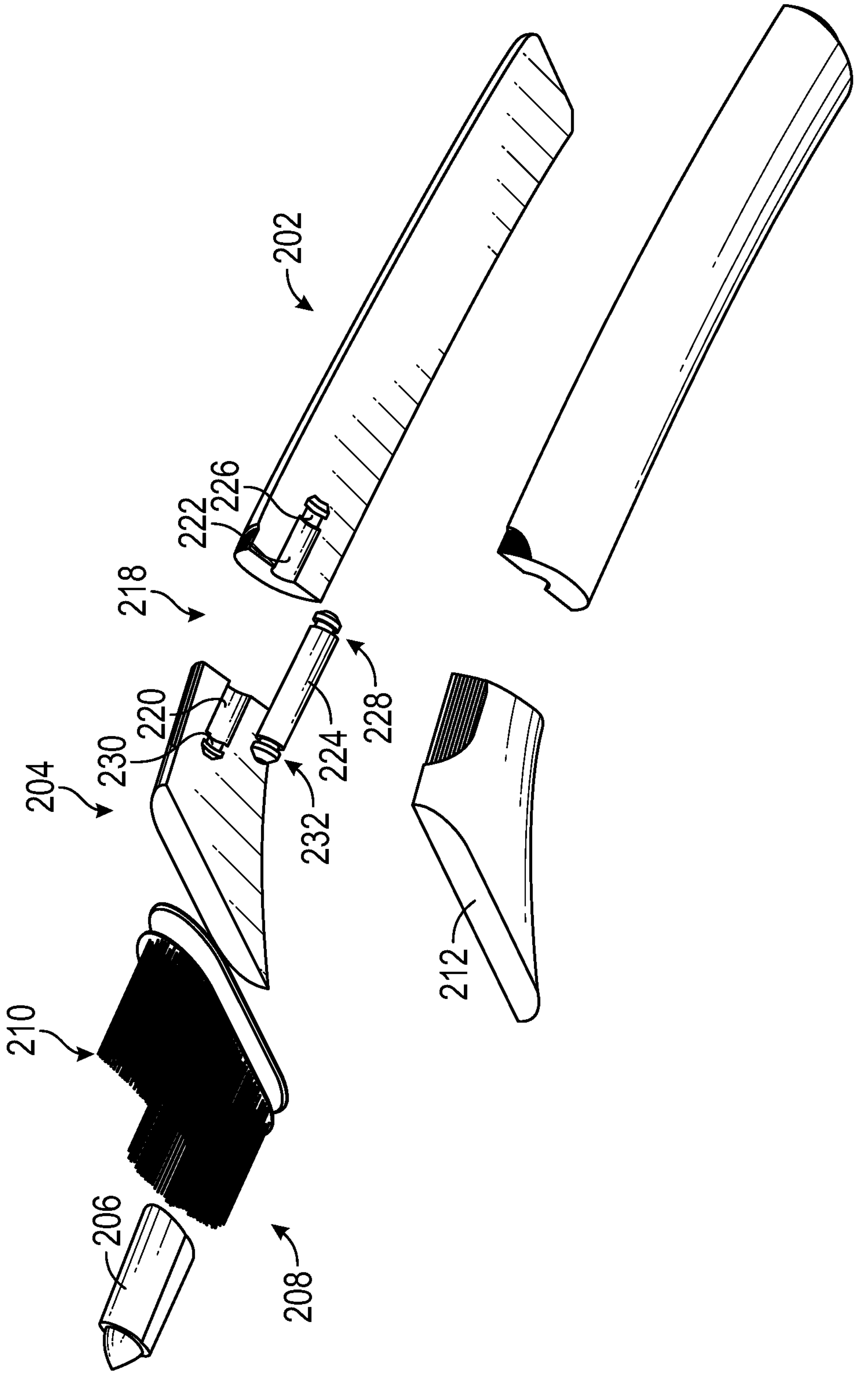
FIG. 5 depicts an exploded view of a cleaning device in accordance with one or more embodiments of the disclosure.

As depicted in FIG. 5, the handle 202 may be attached to the head end 204 via a pivot joint 218. In this manner, the handle 202 may be configured to rotate 360 degree about the head end 204 via the pivot joint 218. The pivot joint 218 may be any suitable size, shape, or configuration. In some instances, the pivot joint 218 may include a handle slot 222 disposed within the handle 202 and a head end slot 220 disposed within the head end 204. A bearing 224 (or pivot) may be disposed within the handle slot 222 and the head end slot 220 in order to facilitate rotation of the head end 204 about the handle 202. For example, the handle slot 222 may include a handle lip 226 configured to mate with a corresponding handle channel 228 on the bearing 224. Likewise, the head end slot 220 may include a head end lip 230 configured to mate with a corresponding head end channel 232 on the bearing 224. In this manner, the handle 202 and the head end 204 may rotate about the bearing 224, which may be secured within the handle 202 and the head end 204. That is, the bearing 224 may be secured within the handle 202 via the handle lip 226 and handle channel 228, and bearing 224 may be secured within the head end 204 via the head end lip 230 and head end channel 232.

Figure 6B:
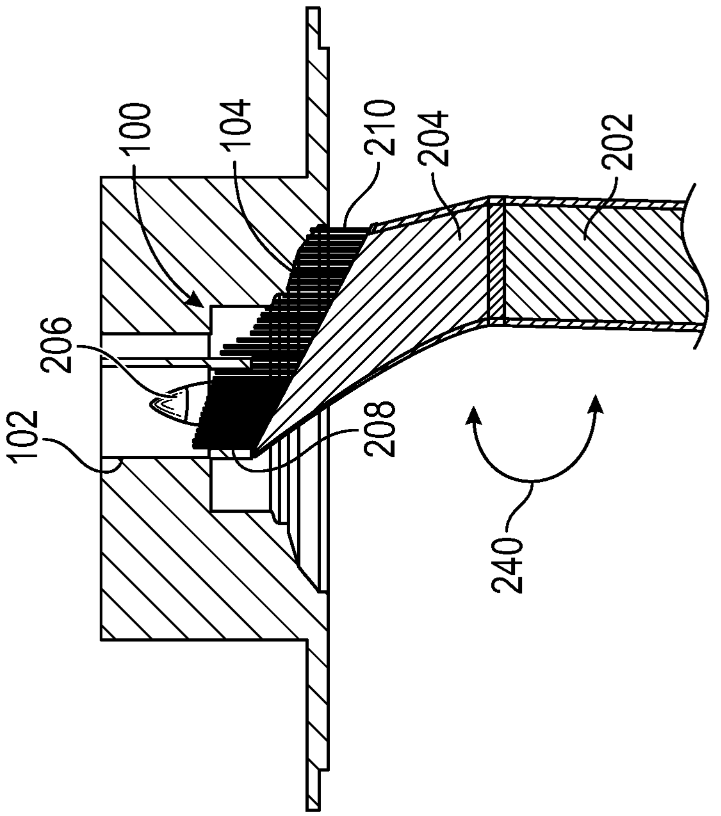
FIGS. 6A and 6B depict cross-sectional views of a cleaning device being inserted into a dispensing nozzle assembly in accordance with one or more embodiments of the disclosure.
Figure 6A:
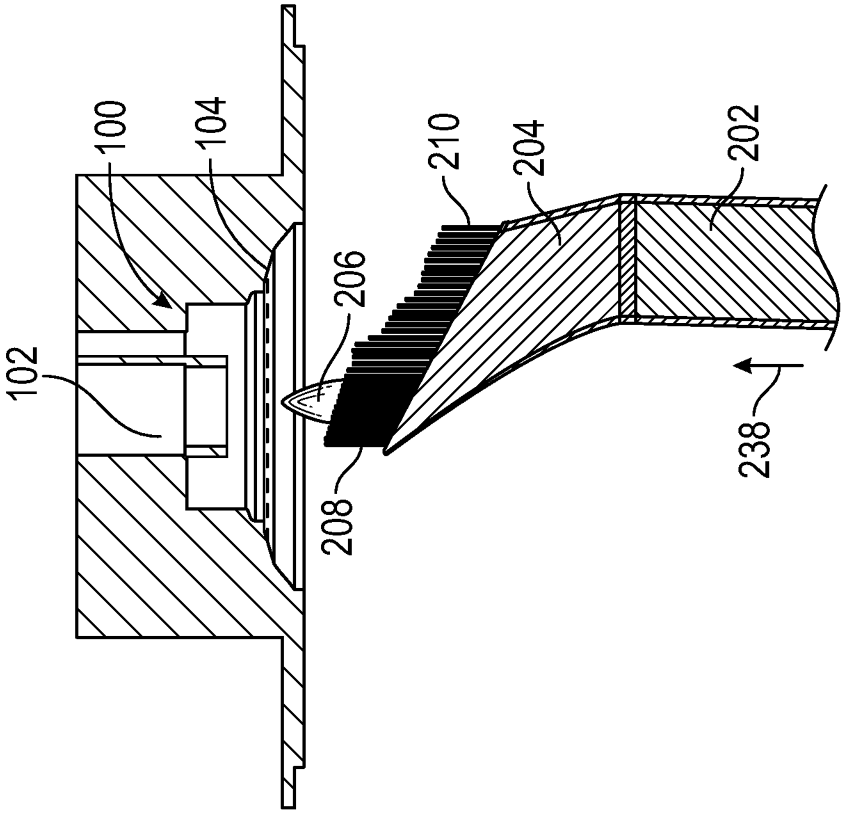
Figure 7:
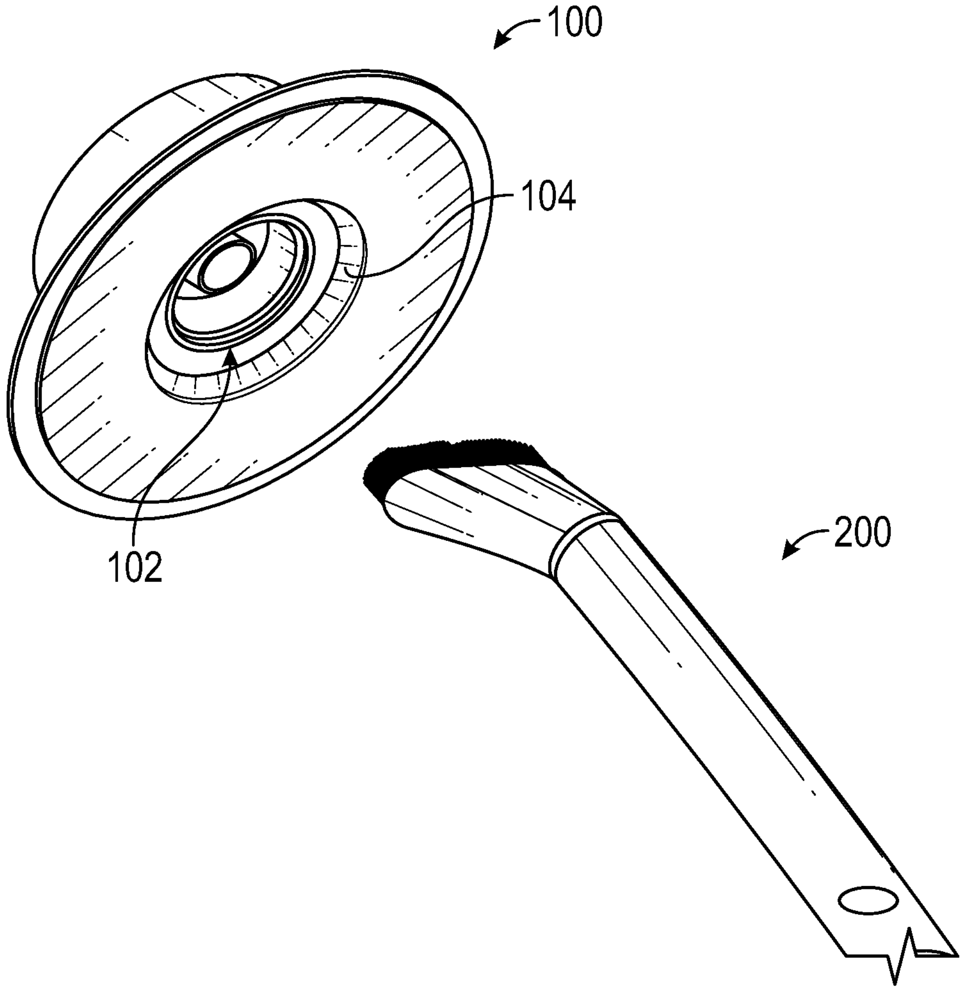
FIG. 7 depicts a cleaning device being removed from a dispensing nozzle assembly in accordance with one or more embodiments of the disclosure.

As depicted in FIGS. 6A to 7, the cleaning device 200 may be configured to clean the dispensing nozzle assembly 100. For example, the guidance protrusion 206 may be configured to be inserted into the macro-ingredient/diluent outlet 102, as depicted by arrow 238. When the guidance protrusion 206 is positioned within the macro-ingredient/diluent outlet 102, the first set of bristles 208 may be disposed within and around the macro-ingredient/diluent outlet 102. In this manner, the first set of bristles 208 may be configured to clean in and around the macro-ingredient/diluent outlet 102. The size, shape, and configuration of the first set of bristles 208 may be customized to a number of different nozzles so as to correspond to the size, shape, and configuration of the macro-ingredient/diluent outlet 102. Similarly, when the guidance protrusion 206 is positioned within the macro-ingredient/diluent outlet 102, the second set of bristles 210 may be disposed within and around the micro-ingredient outlets 104. In this manner, the second set of bristles 210 may be configured to clean in and around the micro-ingredient outlets 104. The size, shape, and configuration of the second set of bristles 210 may be customized to a number of different nozzles so as to correspond to the size, shape, and configuration of the micro-ingredient outlets 104.

In order to clean the dispensing nozzle assembly 100, the first set of bristles 208 and the second set of bristles 210 may be rotated (clockwise or counterclockwise) about the dispensing nozzle assembly 100, as depicted by arrow 240. For example, a user may rotate the first set of bristles 208 and the second set of bristles 210 about the dispensing nozzle assembly 100 by moving the handle 202 along a circular path. As a result, the head end 204 may rotate about the handle 202 via the bearing 224, which in turn may rotate the first set of bristles 208 and the second set of bristles 210 about the dispensing nozzle assembly 100.

Figure 8:
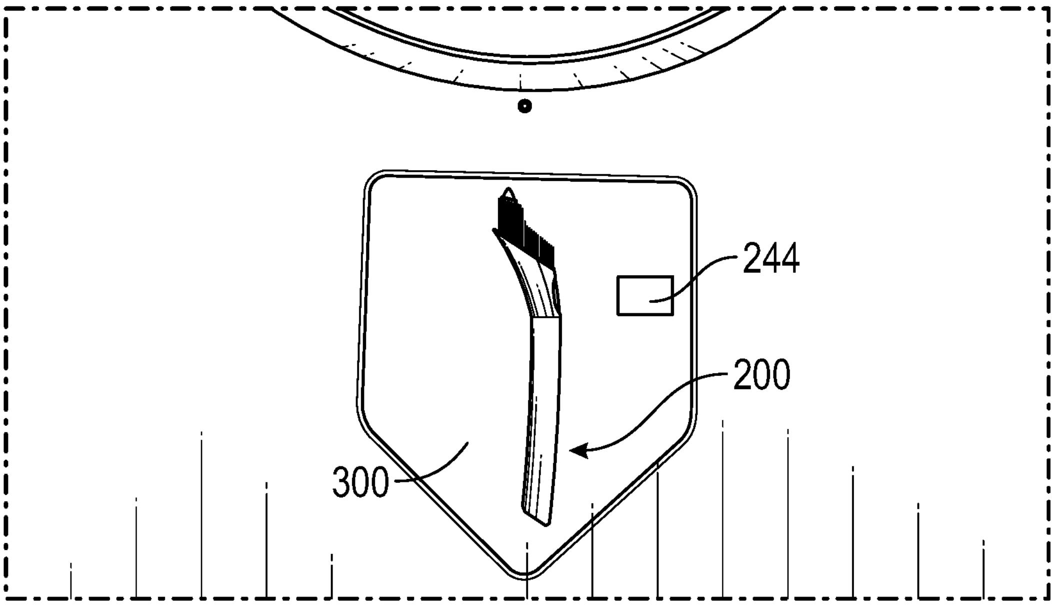
FIG. 8 depicts a cleaning device stowed in a compartment in accordance with one or more embodiments of the disclosure.
Figure 9:
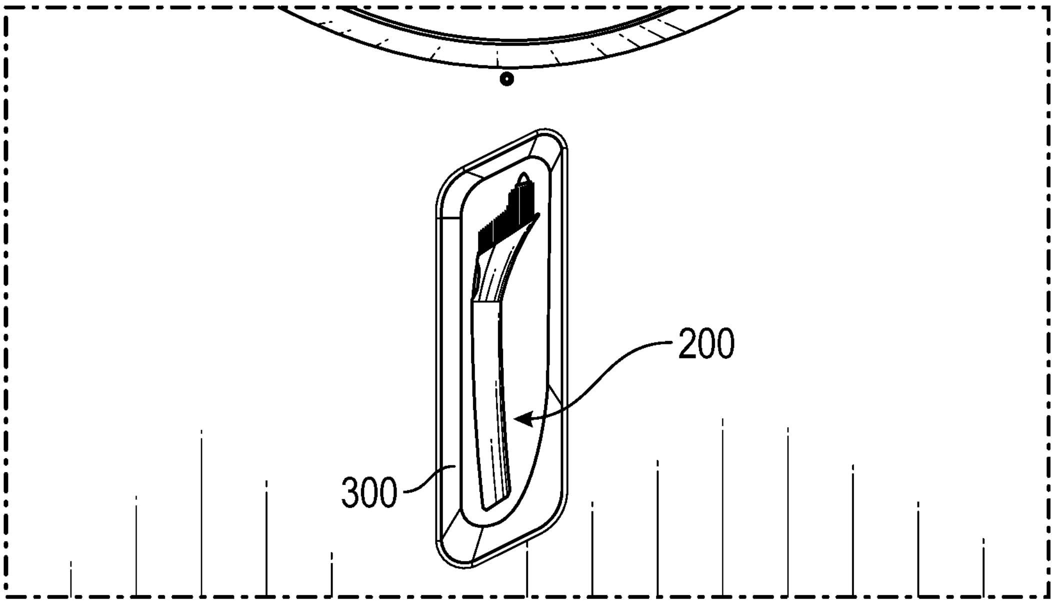
FIG. 9 depicts a cleaning device stowed in a compartment in accordance with one or more embodiments of the disclosure.
Figure 10:
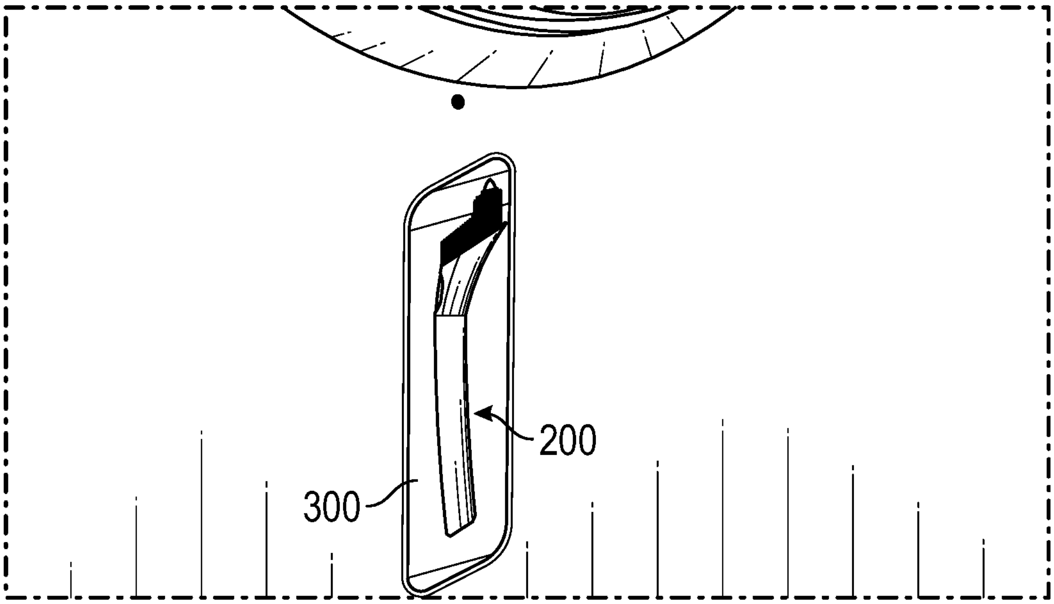
FIG. 10 depicts a cleaning device stowed in a compartment in accordance with one or more embodiments of the disclosure.

As depicted in FIGS. 8-10, the cleaning device 200 may be stored within a compartment 300 of the beverage dispenser, which may or may not include a door. In this manner, the cleaning device 200 may be readily accessible to a user. The compartment 300 may be located anywhere about the beverage dispenser. For example, the compartment 300 may be disposed on the front, back, side, or inside of the beverage dispenser. In some instances, the compartment 300 may be disposed within the door of the beverage dispenser. In certain embodiments, the size, shape, and configuration of the compartment 300 may correspond to the size, shape, and configuration of the cleaning device 200. The compartment 300 may be any suitable size, shape, or configuration.

In some instances, the cleaning device 200 may include an RFID tag 242, as depicted in FIG. 4. For example, the RFID tag may be disposed within the cleaning device 200. The RFID tag may be disposed within the handle 202 or the head end 204. As depicted in FIG. An RFID reader 244 may be disposed within the compartment 300 or elsewhere about the beverage dispenser. In this manner, a controller (or other computing device) in communication with the beverage dispenser and the RFID reader may be able to determine if/when the cleaning device is used and/or if the cleaning device is properly stowed or lost after a cleaning. In other instances, a sensor within the compartment may sense the removal and replacement of the cleaning device 200 therein.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A cleaning device for cleaning a dispensing nozzle assembly of a beverage dispenser, wherein the dispensing nozzle assembly comprises a macro-ingredient/diluent outlet and a plurality of micro-ingredient outlets surrounding the macro-ingredient/diluent outlet, the cleaning device comprising:

a handle;

a head end rotatably attached to the handle;

a guidance protrusion extending from the head end;

a first set of bristles extending from the head end and surrounding the guidance protrusion; and a second set of bristles extending from the head end adjacent to the first set of bristles, wherein a longitudinal axis of the guidance protrusion is offset from and substantially parallel with a longitudinal axis of the handle.

2. The cleaning device of claim 1, wherein the guidance protrusion is configured to be inserted into the macro-ingredient/diluent outlet.

3. The cleaning device of claim 1, wherein the first set of bristles are configured to clean in and around the macro-ingredient/diluent outlet.

4. The cleaning device of claim 1, wherein the second set of bristles are configured to clean in and around the plurality of micro-ingredient outlets.

5. The cleaning device of claim 1, wherein the first set of bristles are longer than the second set of bristles.

6. The cleaning device of claim 1, wherein the handle is attached to the head end via a pivot.

7. The cleaning device of claim 6, wherein the handle is configured to rotate 360 degree about the head end via the pivot.

8. The cleaning device of claim 1, wherein the head end comprises a planar surface, and wherein the guidance protrusion, the first set of bristles, and the second set of bristles extend from the planar surface.

9. The cleaning device of claim 8, wherein the planar surface is angled relative to the longitudinal axis of the handle.

10. The cleaning device of claim 1, wherein the head end is offset from the handle such that the guidance protrusion is offset from the longitudinal axis of the handle.

11. The cleaning device of claim 1, further comprising an RFID tag disposed within the cleaning device.

12. The cleaning device of claim 1, wherein the cleaning device is configured to be stored in a compartment within the beverage dispenser.

13. A method for cleaning a dispensing nozzle assembly of a beverage dispenser, wherein the dispensing nozzle assembly comprises a macro-ingredient/diluent outlet and a plurality of micro-ingredient outlets surrounding the macro-ingredient/diluent outlet, the method comprising:

positioning a guidance protrusion attached to a head end within the a macro-ingredient/diluent outlet;

positioning a first set of bristles attached to the head end and surrounding the guidance protrusion in and around the macro-ingredient/diluent outlet;

positioning a second set of bristles attached to the head end and adjacent to the first set of bristles in and around the plurality of micro-ingredient outlets; and rotating the head end via a handle rotatably coupled to the head end.

* * * * *